(12) United States Patent
Kim et al.

(10) Patent No.: US 12,454,023 B2
(45) Date of Patent: Oct. 28, 2025

(54) SAFETY BUSBAR AND METHOD FOR MANUFACTURING THE SAME

(71) Applicant: A.F.W. Co., Ltd., Chilgok-gun (KR)

(72) Inventors: Kiyoung Kim, Daegu (KR); Youngmin Leem, Daegu (KR)

( * ) Notice: Subject to any disclaimer, the term of this patent is extended or adjusted under 35 U.S.C. 154(b) by 308 days.

(21) Appl. No.: 17/744,629

(22) Filed: May 14, 2022

(65) Prior Publication Data
US 2023/0264288 A1    Aug. 24, 2023

(30) Foreign Application Priority Data

Feb. 21, 2022    (KR) .................. 10-2022-0022053

(51) Int. Cl.
| | | |
|---|---|---|
| B23K 20/12 | (2006.01) | |
| H01B 1/02 | (2006.01) | |
| H01B 13/00 | (2006.01) | |
| H01B 13/22 | (2006.01) | |
| B23K 101/38 | (2006.01) | |
| B23K 103/10 | (2006.01) | |
| B23K 103/12 | (2006.01) | |
| B23K 103/18 | (2006.01) | |

(52) U.S. Cl.
CPC .......... *B23K 20/1205* (2013.01); *H01B 1/02* (2013.01); *H01B 13/0036* (2013.01); *H01B 13/22* (2013.01); *B23K 2101/38* (2018.08); *B23K 2103/10* (2018.08); *B23K 2103/12* (2018.08); *B23K 2103/18* (2018.08)

(58) Field of Classification Search
None
See application file for complete search history.

(56) References Cited

U.S. PATENT DOCUMENTS

| | | | | |
|---|---|---|---|---|
| 3,911,567 | A * | 10/1975 | Hofer | H02G 5/002 228/115 |
| 8,911,248 | B1* | 12/2014 | Wildstone | H02J 9/06 307/65 |
| 2021/0237196 | A1* | 8/2021 | Kim | B23K 20/2333 |
| 2022/0072652 | A1* | 3/2022 | Kim | H01R 43/0214 |

FOREIGN PATENT DOCUMENTS

| | | |
|---|---|---|
| CN | 111164873 A | 5/2020 |
| DE | 202017101500 U1 | 4/2017 |
| JP | 2007-250301 A | 9/2007 |
| JP | 2020-104172 A | 7/2020 |
| JP | 2020-140951 A | 9/2020 |
| KR | 10-2014-0080120 | 6/2014 |
| KR | 10-1836516 | 3/2018 |

(Continued)

OTHER PUBLICATIONS

English Specification of 10-1836516.

(Continued)

*Primary Examiner* — Devang R Patel
(74) *Attorney, Agent, or Firm* — ANTONIO HA & U.S. PATENT, LLC (57) ABSTRACT

According to an embodiment, a method for manufacturing a safety busbar comprises placing a second conductor on each of two opposite ends of a first conductor, performing linear friction welding between the first conductor and the second conductor, and cutting the first conductor to a predetermined depth.

4 Claims, 14 Drawing Sheets

(56) References Cited

FOREIGN PATENT DOCUMENTS

| KR | 10-1947387 | 2/2019 | | |
|----|-----------|--------|---|---|
| KR | 10-2019069 | 9/2019 | | |
| KR | 10-2024575 | 9/2019 | | |
| KR | 102024575 B1 * | 9/2019 | ............ | H01B 1/023 |
| KR | 10-2258703 | 6/2021 | | |

OTHER PUBLICATIONS

English Specification of 10-2014-0080120.
English Specification of 10-2019069.
English Specification of JP2020-140951A.
English Specification of 10-2258703.
English Specification of 10-1947387.
English Specification of JP2020-104172A.
English Specification of DE202017101500 U1.
English Specification of CN111164873A.

* cited by examiner

SAFETY BUSBAR AND METHOD FOR MANUFACTURING THE SAME

CROSS-REFERENCE TO RELATED APPLICATION

This application is based on and claims priority under 35 U.S.C. 119 to Korean Patent Application No. 10-2022-0022053, filed on Feb. 21, 2022, in the Korean Intellectual Property Office, the disclosure of which is herein incorporated by reference in its entirety.

TECHNICAL FIELD

Embodiments of the disclosure relate to a safety busbar and a method for manufacturing the same, which has a simplified manufacturing process and may prevent scattering of busbar dust or fragments.

DESCRIPTION OF RELATED ART

In electric power distribution, a busbar (also bus bar) is a metallic strip or bar, typically housed inside switchgear, panel boards, and busway enclosures for local high current power distribution. They are also used to connect high voltage equipment at electrical switchyards, and low voltage equipment in battery banks. Busbars recently have many applications and are replacing cables by their merits.

Conventionally, a busbar is formed of copper alone and has a narrowed middle for easier disconnection to cut off overcurrent. However, such narrowed middle is vulnerable to external impact and may be easily broken or have cracks. Further, due to use of copper alone, conventional busbars are expensive and heavy.

Some other conventional busbars include a low-melting point portion between the input terminal and output terminal. The low-melting point portion is disconnected when the overcurrent is applied to the busbar. The low-melting point is temporarily fixed in position and may easily be escaped off due to external impact. Further, such type of busbar is complicated to manufacture and use.

SUMMARY

According to embodiments of the disclosure, there is provided a method for manufacturing a safety busbar, which allows for a simple manufacturing process, a safety busbar with superior quality, and may prevent scattering of busbar dust or fragments when the safety busbar is broken due to, e.g., overcurrent.

According to an embodiment, a method for manufacturing a safety busbar comprises placing a second conductor on each of two opposite ends of a first conductor, performing linear friction welding between the first conductor and the second conductor, and cutting the first conductor to a predetermined depth.

The first conductor may be formed of aluminum.

The second conductor may be formed of copper.

The method may further comprise forming a notch in a middle of the first conductor.

The method may further comprise etching the first conductor.

The method may further comprise performing first surface treatment on two opposite side surfaces of the first conductor and performing second surface treatment on a side surface of the second conductor.

The method may further comprise coating the first surface with a coating material. The coating material may include a resin.

The method may further comprise installing a spacer on the first conductor and installing a tube on the first conductor, with the spacer interposed between the first conductor and the tube. A space may be formed between the tube and the first conductor.

There is also provided a safety busbar manufactured by the above-described method.

According to an embodiment, a safety busbar comprises a first conductor formed of aluminum and a second conductor formed of copper. The second conductor is formed on each of two opposite sides of the first conductor. The first conductor is formed to have a smaller thickness than the second conductor.

A notch may be formed in a middle of the first conductor.

A terminal hole may be formed in an end of the second conductor.

The first conductor may be coated with a resin.

The safety busbar may further comprise a spacer formed on the first conductor and a tube formed on the first conductor, with the spacer interposed between the first conductor and the tube. A space may be formed between the tube and the first conductor.

BRIEF DESCRIPTION OF THE DRAWINGS

A more complete appreciation of the present disclosure and many of the attendant aspects thereof will be readily obtained as the same becomes better understood by reference to the following detailed description when considered in connection with the accompanying drawings, wherein.

DETAILED DESCRIPTION

Embodiments of the present invention are now described with reference to the accompanying drawings in such a detailed manner as to be easily practiced by one of ordinary skill in the art. However, the embodiments set forth herein are provided merely for a better understanding of the structure and functions, and the scope of the disclosure should not be limited thereby or thereto. Thus, various changes or modifications may be made to the embodiments and various equivalents thereof may be included in the scope of the disclosure. It should be noted that a specific embodiment of the disclosure need not include all of the objectives or effects set forth herein and the scope of the disclosure should not be limited thereto or thereby.

The terms as used herein may be defined as follows.

The terms "first" and "second" are used to distinguish one component from another, and the scope of the disclosure should not be limited thereby. For example, a first component may be denoted a second component, and vice versa without departing from the scope of the present disclosure.

When a component is "connected to" or "coupled to" another component, the component may be directly connected or coupled to the other component, or other component(s) may intervene therebetween. In contrast, when a component is "directly connected to" or "directly coupled to" another component, no other intervening components may intervene therebetween. Other terms or phrases representing the relationship between two or more components, such as 'between' and 'adjacent to,' may be interpreted the same way.

As used herein, the singular forms "a," "an," and "the" are intended to include the plural forms as well, unless the context clearly indicates otherwise. It will be further understood that the terms "comprise" and/or "have," when used in this specification, specify the presence of stated features, integers, steps, operations, elements, and/or components, but do not preclude the presence or addition of one or more other features, integers, steps, operations, elements, components, and/or groups thereof.

Unless otherwise defined in connection with embodiments of the present disclosure, all terms including technical and scientific terms used herein have the same meaning as commonly understood by one of ordinary skill in the art to which the embodiments of the present disclosure belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a safety busbar according to an embodiment of the disclosure is described in detail with reference to the drawings.

Figure 1:
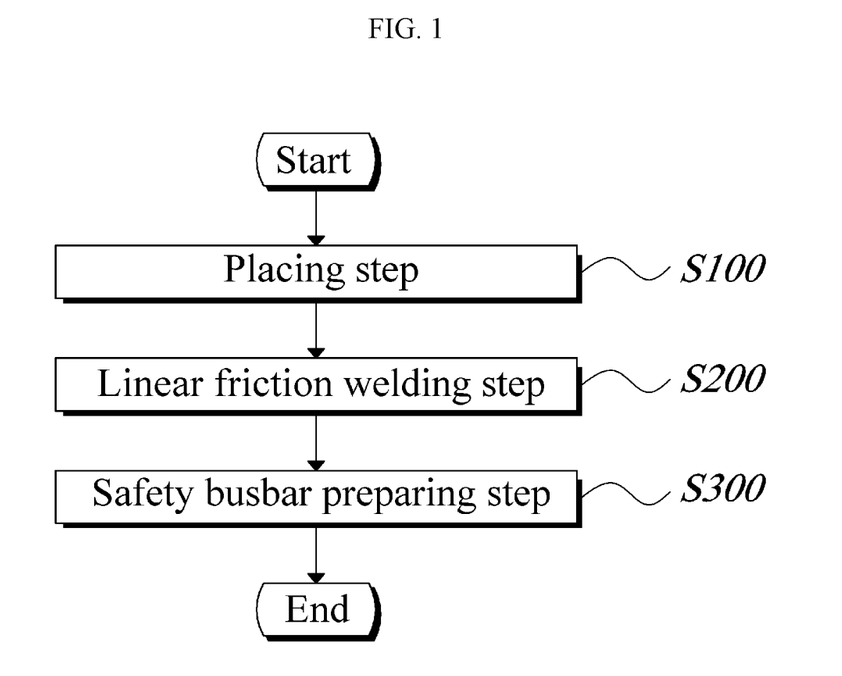
FIG. 1 is a flowchart illustrating a method for manufacturing a safety busbar according to an embodiment.

FIG. 1 is a flowchart illustrating a method for manufacturing a safety busbar according to an embodiment.

Referring to FIG. 1, a method for manufacturing a safety busbar, according to an embodiment, includes a placing step S100, a linear friction welding step S200, and a safety busbar preparing step S300.

In the placing step S100, second conductors 200 are placed on two opposite ends of a first conductor 100.

The first conductor 100 may be formed of aluminum which has a low melting point. Thus, when overcurrent flows through the first conductor 100, the temperature of the first conductor 100 may rise, so that the first conductor 100 may be melted and broken, leading to electrical disconnection.

The second conductor 200 may be formed of copper which has high electrical conductivity and a high melting point.

The first conductor 100 and the second conductor 200 may be formed by compressing their respective metal pieces (e.g., aluminum piece and copper piece, respectively), into a rectangular block or plate by a compressor or a press. The length of the first conductor 100 may be shorter than the length of the second conductor 200.

In the placing step S100, two second conductors 200 may be placed on the left and right ends, respectively, of the first conductor 100.

In the placing step S100, the first conductor 100 and the second conductor 200 may be brought in tight contact with each other to prevent either from floating.

In the linear friction welding step S200, linear friction welding is formed between the first conductor 100 and the second conductor 200.

Linear friction welding is a welding process or technique that generates heat through mechanical friction between workpieces in lateral or linear oscillation to one another, with the addition of a lateral force to plastically displace and fuse the materials In the linear friction welding step S200, a linear friction welder linearly oscillates the first conductor 100 at a frequency of 40 Hz to 450 Hz, with the first conductor 100 and the second conductor 200 in tight contact, and generates frictional heat between the first conductor 100 and the second conductor 200 while applying a pressure of 120 MPa to 150 MPa between the first conductor 100 and the second conductor 200, thereby fusing and joining the first conductor 100 and the second conductor 200.

In this case, as a mixture layer is formed and cured between a diffusion layer formed in the first conductor 100 and a diffusion layer formed in the second conductor 200, the first conductor 100 and the second conductor 200 may be securely joined together at high strength and may remain without defects or cracks in the welded portion although other processes, such as cutting, are performed thereon.

In the safety busbar preparing step S300, the first conductor 100 is cut to a predetermined depth (e.g., 1 mm to 3 mm), forming a safety busbar.

In the second bracket preparing step S300, the top and bottom surfaces of the first conductor 100 may be cut by a cutting machine, e.g., a vertical machining center.

Figure 2:
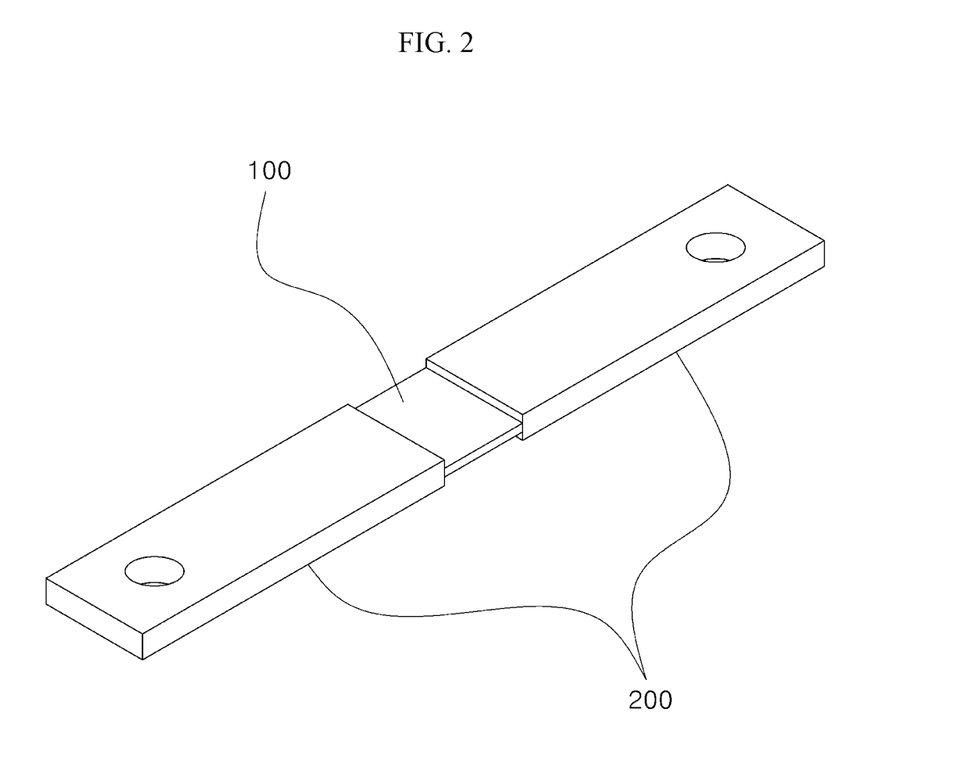
FIGS. 2 and 3 are views illustrating a safety busbar manufactured by a method for manufacturing a safety busbar according to an embodiment.
Figure 3:
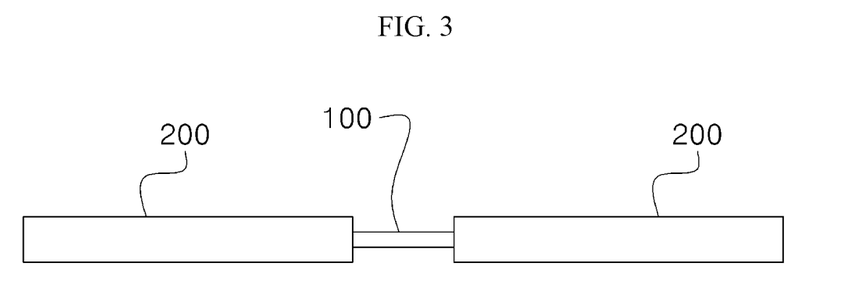

The so-prepared safety busbar is shown in FIGS. 2 and 3.

The safety busbar prepared in the safety busbar preparing step S300 may be cut to a desired size, and terminal holes for connection with terminals may be formed by punching two opposite ends of the safety busbar using a punching machine.

When overcurrent flows through the safety busbar, the middle portion of the first conductor 100, which is relatively thin, e.g., thinner than the second conductors 200, may be broken, cutting off the current and hence securing safety. As the first conductor 100 which is an aluminum piece and the second conductor 200 which is a copper piece are linearly friction-welded to each other, the manufacturing method may produce a safety busbar that is lightweight and has high strength and in which the first conductor 100 and the second conductor 200 are securely joined together, and may save manufacturing costs.

Further, the manufacturing method according to the disclosure is simple and may enhance productivity and is thus advantageous for mass production of safety busbars.

Figure 4:
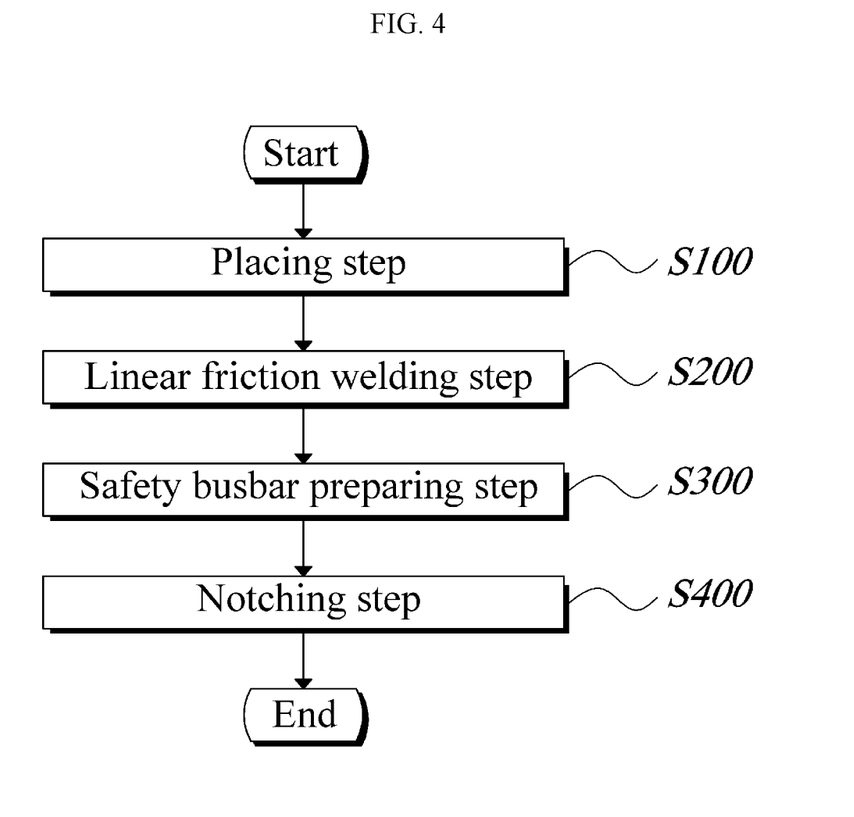
FIG. 4 is a flowchart illustrating a method for manufacturing a safety busbar according to an embodiment.

FIG. 4 is a flowchart illustrating a method for manufacturing a safety busbar according to an embodiment.

Referring to FIG. 4, a method for manufacturing a safety busbar, according to an embodiment, includes a placing step S100, a linear friction welding step S200, a safety busbar preparing step S300, and a notching step S400. The placing step S100, the linear friction welding step S200, and the safety busbar preparing step S300 may be substantially the same as the steps S100, S200, and S300 of the embodiment.

In the notching step S400, after the safety busbar preparing step S300, one or more notches 300 are formed in the middle of the first conductor 100 using a cutting or notching machine.

The notch formed in the middle of the first conductor 100 in the notching step S400 may be shaped as 'V,' a rectangle, a triangle, but without limited thereto, be formed in other various shapes.

In the notching step S400, one or more notches 300 may be formed in the front surface, rear surface, top, or bottom, as well as the middle.

Figure 5:
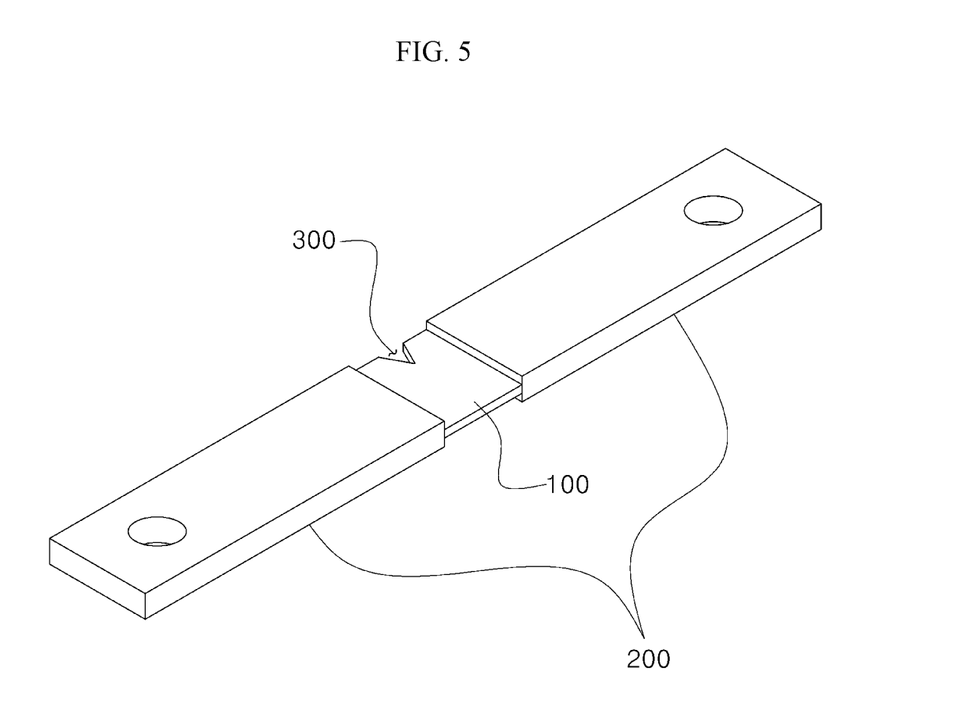
FIG. 5 is a view illustrating a safety busbar manufactured by a method for manufacturing a safety busbar according to an embodiment.

An example safety busbar formed according to the embodiment is shown in FIG. 5.

As one or more notches 300 are formed in the middle of the first conductor 100, the safety busbar may perform its overcurrent cut-off function more sensitively to overcurrent.

Figure 6:
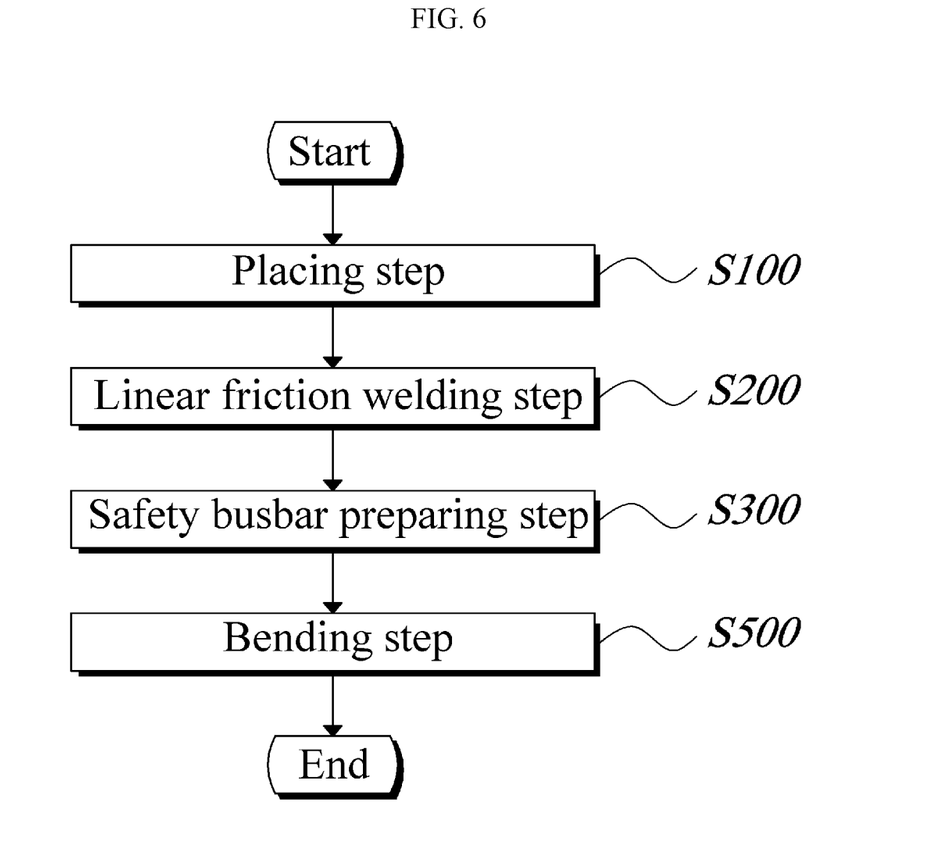
FIG. 6 is a flowchart illustrating a method for manufacturing a safety busbar according to an embodiment.

FIG. 6 is a flowchart illustrating a method for manufacturing a safety busbar according to an embodiment.

Referring to FIG. 6, the safety bus bar manufacturing method further may include a bending step S500 in addition to the manufacturing method of the first embodiment.

In the bending step S500, after the safety busbar preparing step S30, the first conductor 100 is bent at a predetermined angle (e.g., 15° to 90°) in the middle thereof, using a bending machine.

Figure 7:
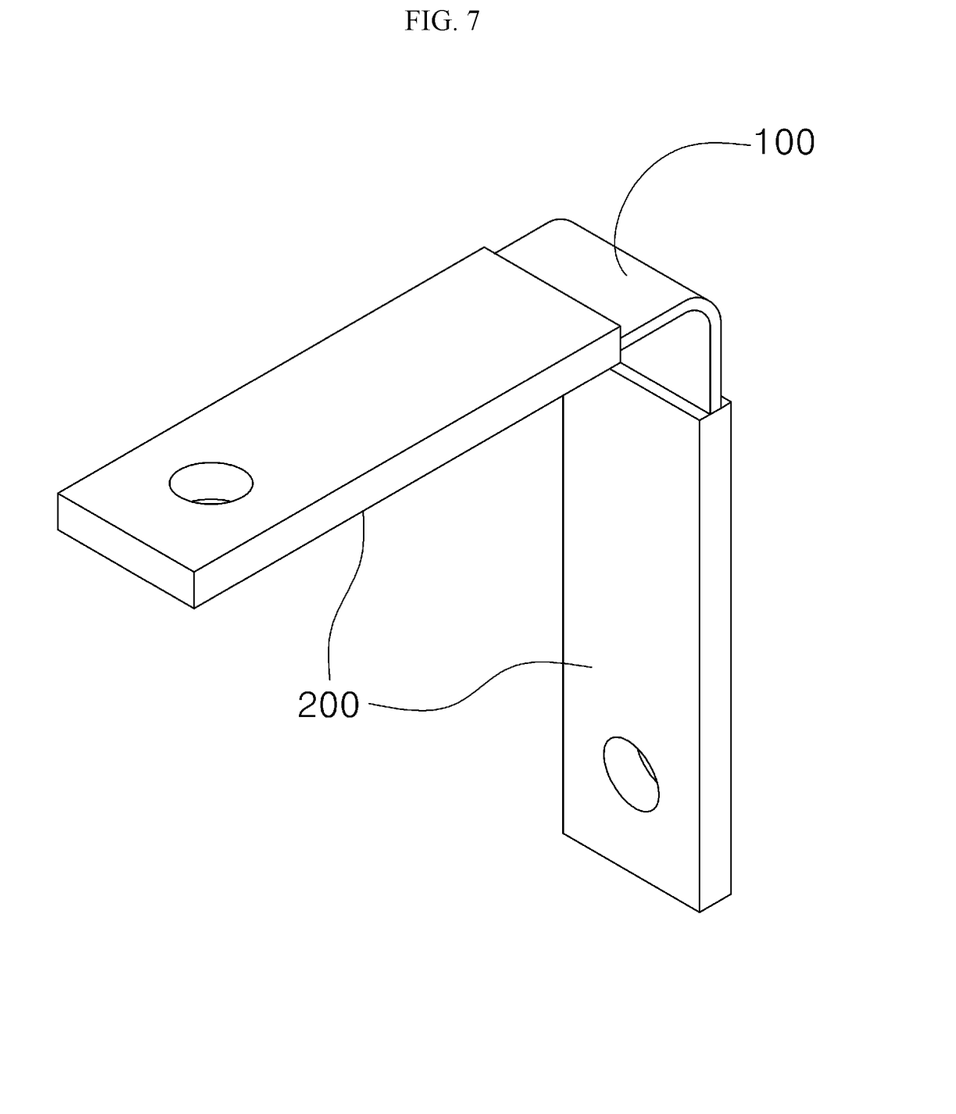
FIG. 7 is a view illustrating a safety busbar manufactured by a method for manufacturing a safety busbar according to an embodiment.

An example safety busbar formed according to the embodiment is shown in FIG. 7.

Thus, the safety bus bar manufacturing method allows the first conductor 100 to be bent to fit the position where the safety busbar is to be installed, leading to easier installation work.

Figure 8:
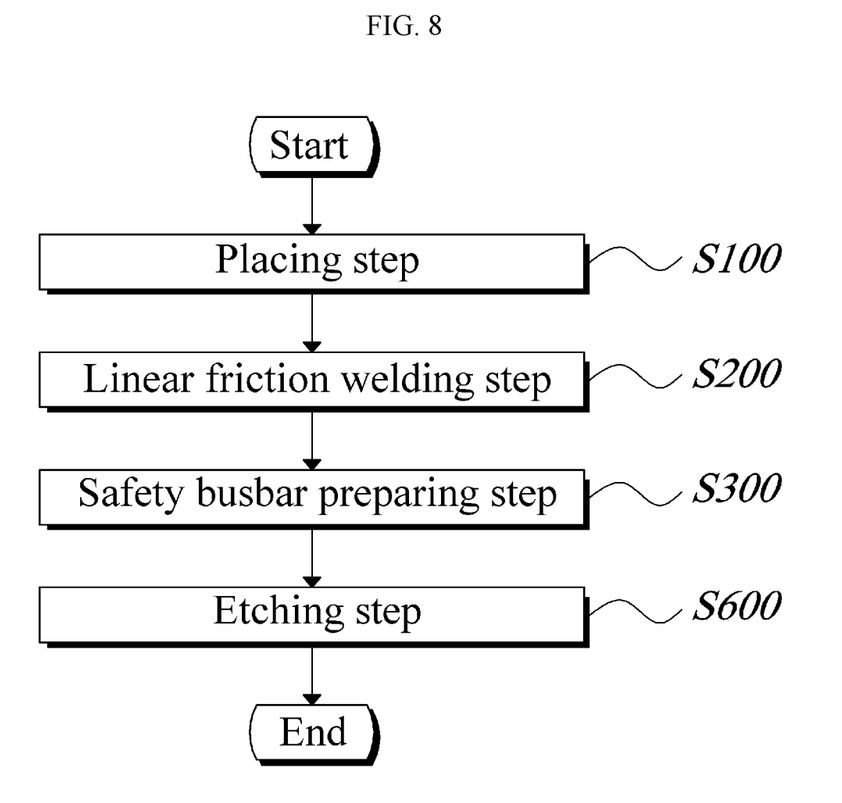
FIG. 8 is a flowchart illustrating a method for manufacturing a safety busbar according to an embodiment.

FIG. 8 is a flowchart illustrating a method for manufacturing a safety busbar according to an embodiment.

Referring to FIG. 8, the safety bus bar manufacturing method further may include an etching step S600 in addition to, e.g., the manufacturing method of the embodiment.

In the etching step S600, after the safety busbar preparing step S300, the first conductor 100 is etched.

In the etching step S600, the first conductor 100 may be etched through a chemical reaction with an etching solution. As the etching solution, various solutions including Oxone™ may be used.

Oxone™ is an organic compound that provides non-chlorinated oxidation in a wide variety of applications such as: industrial processing, etching, pulp and paper production, waste water treatment, industrial and household cleaning, oil and gas production, and denture cleaning.

As described above, in the method for manufacturing a safety busbar according to the disclosure, as the first conductor 100 and the second conductor 200 are subjected to linear friction welding, a diffusion layer is formed in the first conductor 100, and a diffusion layer is formed in the sensing signal converter 152, and the diffusion layers form a mixed layer. The mixed layer may partially remain even after cutting on the first conductor 100 in the safety busbar preparing step S300.

After the safety busbar preparing step S300, the first conductor 100 may be etched to remove the remaining mixed layer. Thus, the over-current cut-off function of the first conductor 100 may be precisely and quickly performed.

Figure 9:
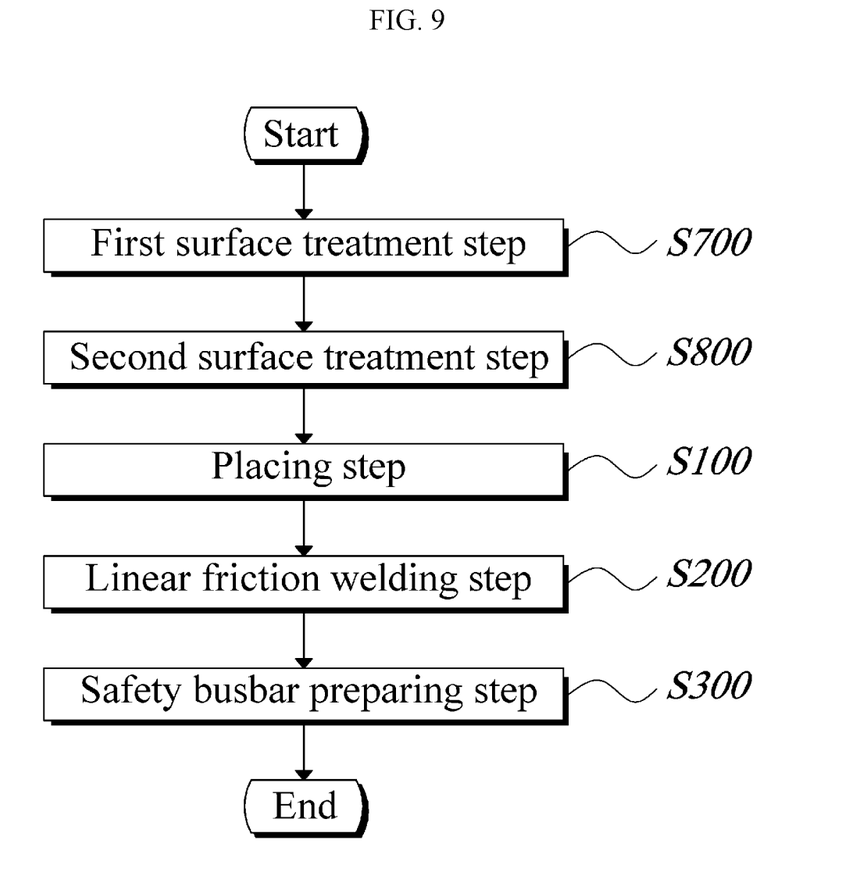
FIG. 9 is a flowchart illustrating a method for manufacturing a safety busbar according to an embodiment.

FIG. 9 is a flowchart illustrating a method for manufacturing a safety busbar according to an embodiment.

The method for manufacturing a safety busbar as shown in FIG. 9 may further include a first surface treatment step S700 and a second surface treatment step S800 in addition to, e.g., the manufacturing method of the embodiment.

The first surface treatment step S700 may be performed before the placing step S100, roughening the two opposite side surfaces of the first conductor 100.

In the first surface treatment step S700, the two opposite side surfaces of the first conductor 100, e.g., the surfaces facing and welded to the second conductors 200, may be roughened using, e.g., a polishing machine or a laser.

For example, the first surface treatment step S700 may process the side surfaces of the first conductor 100 to have a surface roughness of 0.15 μm to 0.50 μm.

The second surface treatment step S800 may be performed before the placing step S100, roughening one side surface of the second conductor 200.

In the second surface treatment step S800, the side surface of the second conductor 200, e.g., the surface facing and welded to the first conductor 100, may be roughened using, e.g., a polishing machine or a laser.

For example, the second surface treatment step S800 may process the side surface of the second conductor 200 to have a surface roughness of 0.15 μm to 0.50 μm.

In the safety busbar manufacturing method, the surfaces of the first conductor 100 and the second conductor 200 are roughened, so that the contact area between the first conductor 100 and the second conductor 200 increases, thereby facilitating welding between the first conductor 100 and the second conductor 200 and leading to more secure joining between the first conductor 100 and the second conductor 200.

Figure 10:
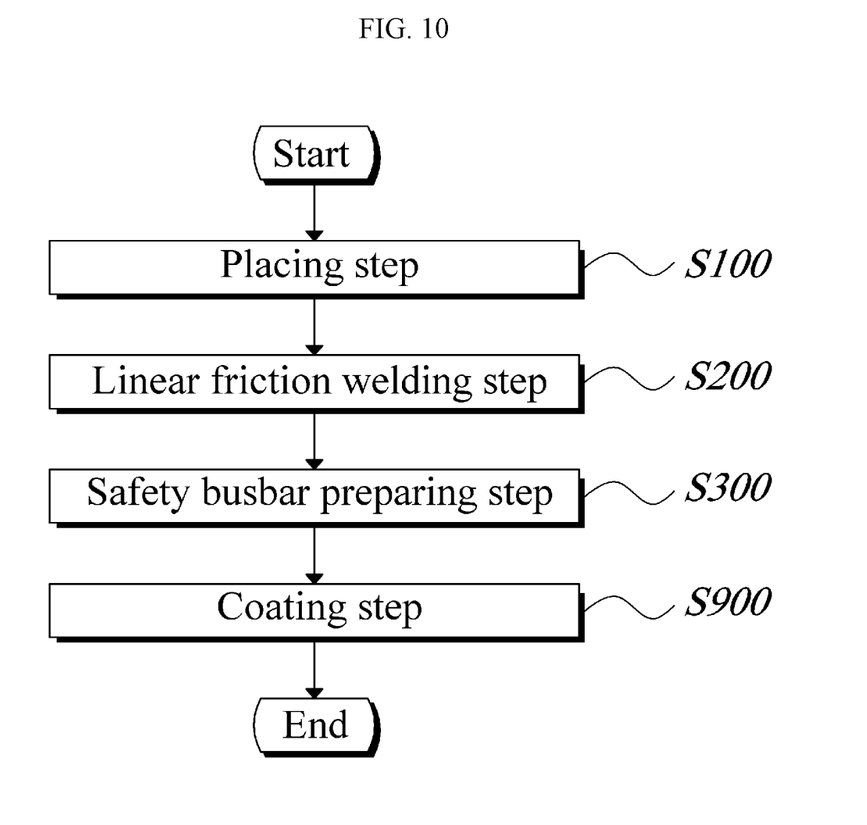
FIG. 10 is a flowchart illustrating a method for manufacturing a safety busbar according to an embodiment.

FIG. 10 is a flowchart illustrating a method for manufacturing a safety busbar according to an embodiment.

Referring to FIG. 10, the safety bus bar manufacturing method further may include a coating step S900 in addition to, e.g., the manufacturing method of the embodiment.

In the coating step S900, after the safety busbar preparing step S300, the surface of the first conductor 100 is coated with a coating material 400.

In an embodiment, in the coating step S900, the surface of the first conductor 100 etched in the etching step S600 may be coated with the coating material 400.

As the coating material 400, a resin coating material that melts at a temperature equal to or lower than the melting point of aluminum, i.e., 660.3° C., may be used. For example, polyvinyl chloride (PVC) or polyethylene (PE) may be used as the coating material 400.

Polyvinyl chloride (PVC) is a kind of flame retardant thermoplastic resin that has good water resistance, acid resistance, and insulation and has a melting point of 150° C. to 170° C.

Polyethylene (PE) is a type of thermoplastic resin as a polymer of ethylene, and has a melting point of 115° C. to 135° C.

Figure 11:
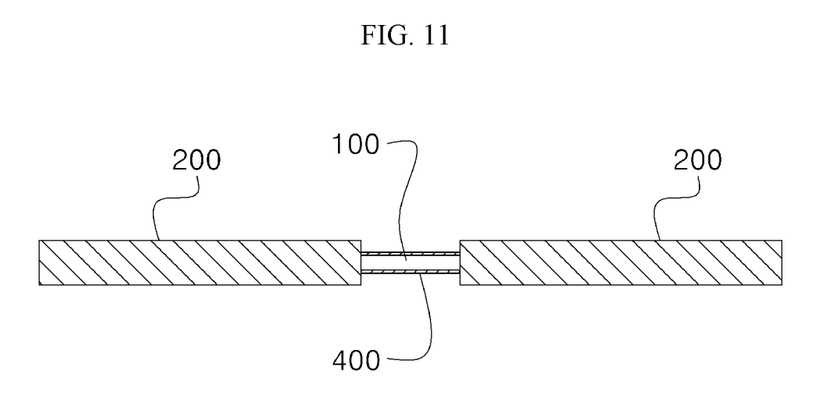
FIG. 11 is a view illustrating a safety busbar manufactured by a method for manufacturing a safety busbar according to an embodiment.

An example safety busbar formed according to the embodiment is shown in FIG. 11.

In the method for manufacturing a safety busbar, the coating material 400 coated on the first conductor 100 may protect the first conductor 100 and, when overcurrent flows, the coating material 400 may be melted earlier than the first conductor 100 and thus has no influence on the breakage of the first conductor 100.

Figure 12:
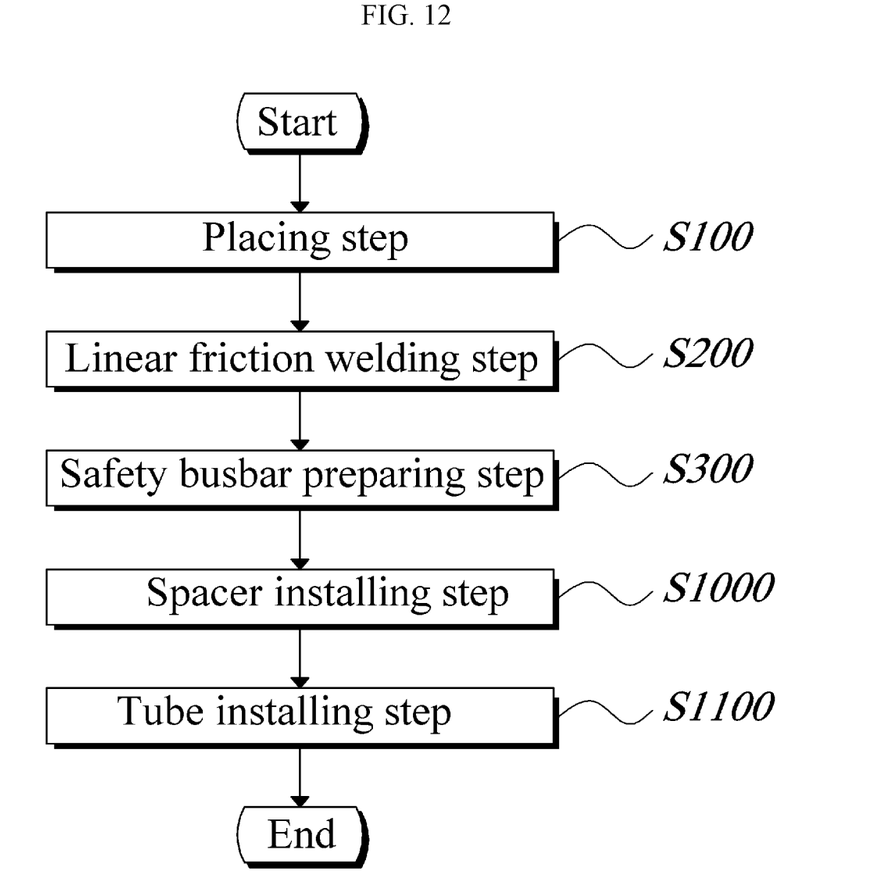
FIG. 12 is a flowchart illustrating a method for manufacturing a safety busbar according to an embodiment.

FIG. 12 is a flowchart illustrating a method for manufacturing a safety busbar according to an embodiment.

The method for manufacturing a safety busbar as shown in FIG. 12 may further include a spacer installing step S1000 and a tube installing step S1100 in addition to, e.g., the manufacturing method of the embodiment.

In the spacer installing step S1000, after the safety busbar preparing step S300, one or more spacers 500 are installed on the first conductor 100.

The spacer 500 is provided to form a gap or space S between the first conductor 100 and the tube 600 and may be formed of an insulator (e.g., rubber or silicone) in a ring or protrusion shape.

According to an embodiment, in the spacer installing step S1000, the spacer 500 may be installed on the first conductor 100 coated with the coating material 400 in the coating step S900.

In the spacer installing step S1100, the spacer 500 may be installed on the first conductor 100 using, e.g., an adhesive.

Although in the spacer installing step S1100 shown and exemplified, the spacer 500 is installed on the first conductor 100, the spacer 500 may be alternatively installed on the inner surface of the tube 600.

In the tube installing step S1100, the tube 600 is installed on the first conductor 100, with the spacer 500 interposed therebetween.

The tube 600 may be formed of an elastic material (e.g., rubber or silicone).

In the tube installing step S1100, the tube 600 may be installed to surround the entire first conductor 100, with the space S formed between the first conductor 100 and the tube 600 by the spacer 500.

According to an embodiment, in the tube installing step S1100, the tube 600 may be fixed to the first conductor 100 using thermocompression and an adhesive on two opposite ends of the tube 600.

Figure 13:
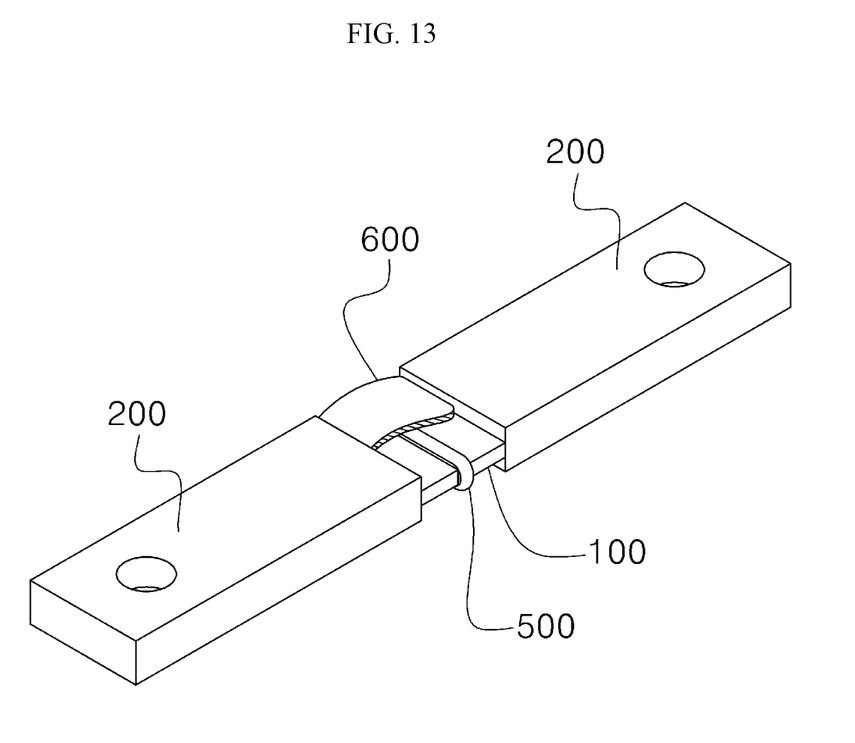
FIGS. 13 and 14 are views illustrating a safety busbar manufactured by a method for manufacturing a safety busbar according to an embodiment.
Figure 14:
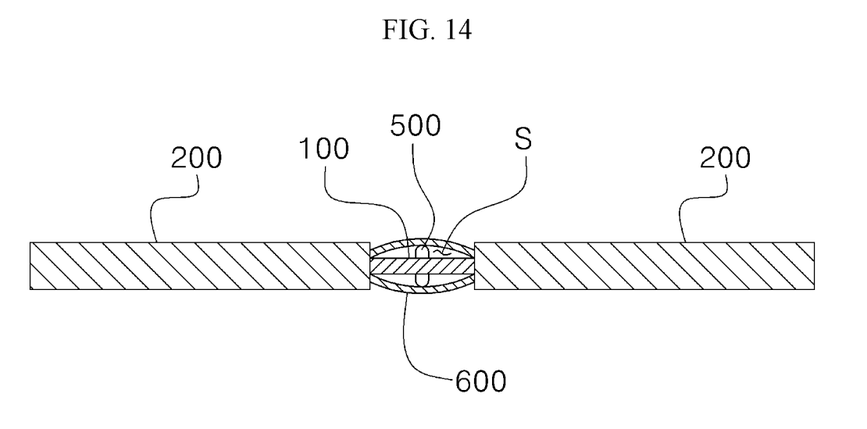

The so-prepared safety busbar is shown in FIGS. 13 and 14.

In the safety busbar manufacturing method, as the tube 600 surrounds the first conductor 100, it is possible to prevent fragments or dust of the first conductor 100 from scattering when the first conductor 100 is broken due to overcurrent.

Further, as the space S is formed between the first conductor 100 and the tube 600 through the spacer 500, the tube 600 may be prevented from disturbing or interfering with breakage of the first conductor 100. Thus, it is possible to allow for easier breakage of the first conductor 100 while effectively preventing scattering of first conductor dust or fragments.

All or some of the steps or operations shown in the flowcharts of the drawings may be combined and performed.

The embodiments of the disclosure may be implemented by a program or application for implementing the functions of the components of the embodiments, as well as by the above-described apparatus and/or methods, or may also be implemented by a recording medium storing the program. Such implementation may be readily made by one of ordinary skilled in the art from the foregoing description of the embodiments.

While the disclosure has been shown and described with reference to exemplary embodiments thereof, it will be apparent to those of ordinary skill in the art that various changes in form and detail may be made thereto without departing from the spirit and scope of the disclosure as defined by the following claims.

What is claimed is:

1. A method for manufacturing a safety busbar, the method comprising:
    placing a second conductor on each of two opposite ends of a first conductor;
    performing linear friction welding between the first conductor and the second conductor; and
    cutting the first conductor to a predetermined depth,
    wherein the method further comprises:
    installing a spacer on the first conductor; and
    installing a tube on the first conductor,
    wherein the tube surrounds the first conductor with the spacer interposed between the first conductor and the tube so that the spacer is placed orthogonally in the center of the tube,
    wherein the tube is formed of an insulator including rubber or silicone in a protrusion shape,
    wherein the tube is fixed to the first conductor using thermocompression and an adhesive on two opposite ends of the tube, and
    wherein a space is formed between the tube and the first conductor.

2. The method of claim 1, wherein the first conductor is formed of aluminum.

3. The method of claim 1, wherein the second conductor is formed of copper.

4. A safety busbar manufactured by the method of claim 1.

* * * * *